United States Patent [19]

Sullivan et al.

[11] 4,267,759

[45] May 19, 1981

[54] TOOL SAFETY LOCK RING

[75] Inventors: Richard D. Sullivan; Allen E. Knies, both of Jasper, Ind.

[73] Assignee: Kimball International, Inc., Jasper, Ind.

[21] Appl. No.: 61,465

[22] Filed: Jul. 27, 1979

[51] Int. Cl.³ .......................... B27B 33/08; B27B 5/32
[52] U.S. Cl. ...................................... 83/665; 144/218
[58] Field of Search ................ 83/481, 838, 665, 666; 144/238, 218; 30/337–339, 388, 347; 51/168

[56] References Cited

U.S. PATENT DOCUMENTS

| | | | |
|---|---|---|---|
| 115,103 | 5/1871 | Rand | 83/666 |
| 265,037 | 9/1882 | Donnell | 83/665 |
| 1,286,799 | 12/1918 | Schuler et al. | 83/666 X |
| 1,636,722 | 7/1927 | Thidaudeau | 83/666 X |
| 2,248,382 | 7/1941 | Phillips | 51/168 |
| 2,508,946 | 5/1950 | Hoffman | 51/168 |
| 3,656,393 | 4/1972 | Goellner | 83/666 |
| 3,850,069 | 11/1974 | Saunders | 83/665 |
| 3,908,499 | 9/1975 | Reed | 83/665 |

Primary Examiner—J. M. Meister
Attorney, Agent, or Firm—Albert L. Jeffers; John F. Hoffman

[57] ABSTRACT

A safety lock ring for a circular tool, such as a sawblade, comprising a first collar with a generally cylindrical body portion and a flange engaging one side of the tool, a circular, split tool, such as a sawblade, comprising a plurality of separate segments and having a central opening, when assembled, through which the body portion of the first collar extends, and a second collar disposed around the first collar body portion and having a tool-engaging surface on the opposite side of the tool. A pair of annular grooves on opposite faces of the tool are in interlocking engagement with corresponding annular ribs on the first and second collars, respectively, and the first collar is urged against the tool face so as to clamp the tool between it and the first collar by means of an outer locking collar threadedly secured to the first collar body portion. Dowels, press set in the flange of the first locking collar, extend into openings in the tool segments so as to key the segments to the flange.

9 Claims, 3 Drawing Figures

U.S. Patent
May 19, 1981
4,267,759
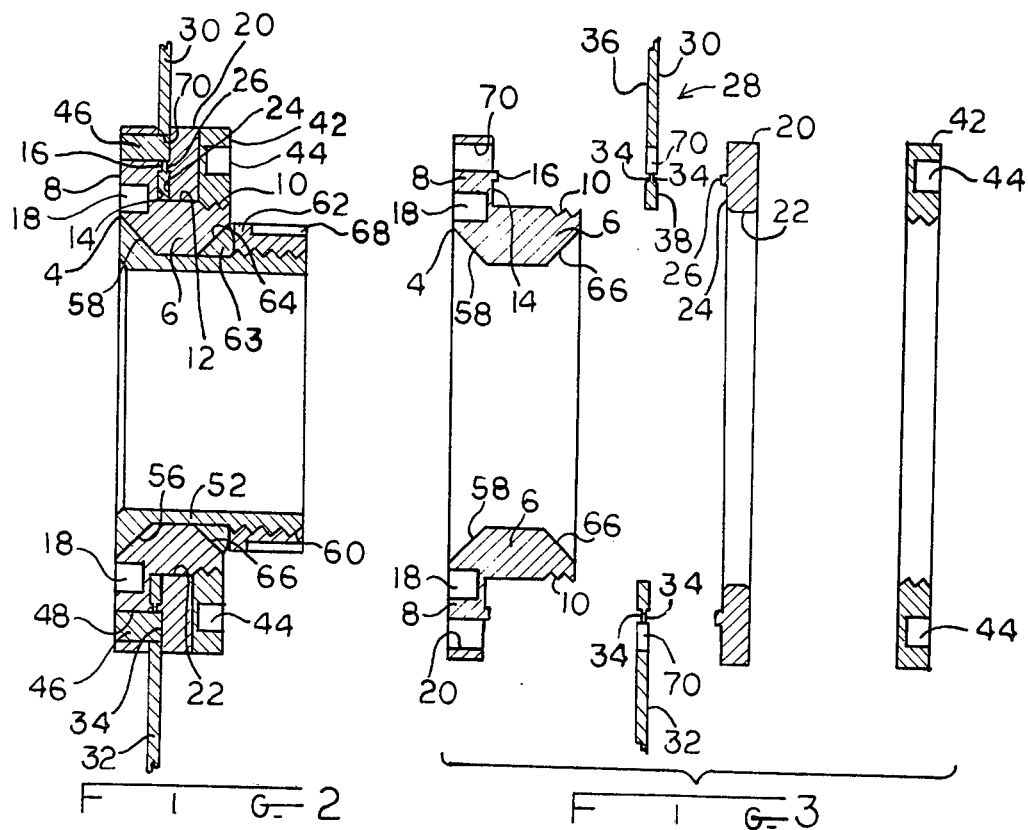
FIG. 2
FIG. 3
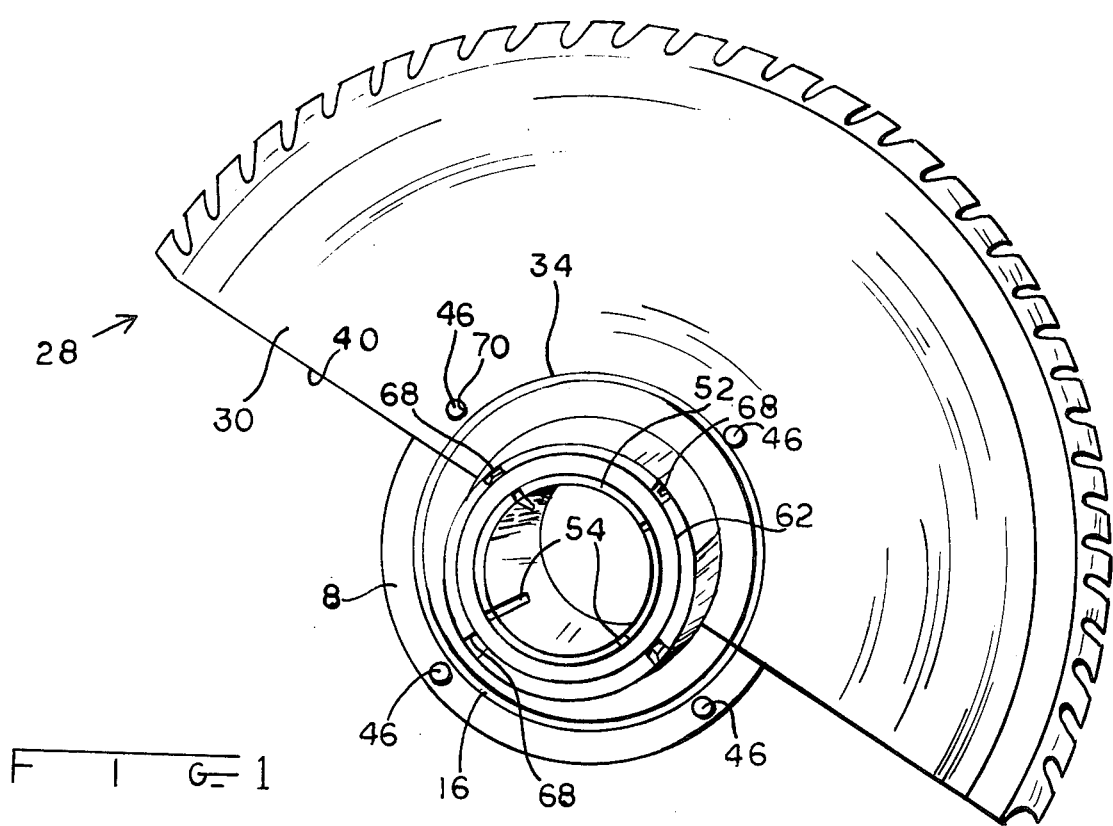
FIG. 1

TOOL SAFETY LOCK RING

BACKGROUND OF THE INVENTION

The present invention relates to locking devices for tools, such as sawblades, and in particular to a locking device for tools of the split type, which comprise two or more segments held together during use.

In commercial woodworking shops of the type where high production articles are being made, such as furniture making factories, circular saws are running nearly constantly, and the blades tend to wear rapidly, thereby requiring frequent replacement. Since the replacement of a blade necessitates shutting the machine down, the longer this procedure takes, the more production time which is lost. To minimize the time which is required to make a blade change, the blades have, in the past, been of the split variety comprising two semi-circular halves. To change a blade of this type, it is not necessary to remove the entire blade axially from the arbor, but merely to loosen the locking ring so that the two halves can be separated radially from the arbor.

Because sawblades utilized in high production woodworking installations are quite large, for example, fourteen inches to sixteen inches in diameter, and rotate at high speeds, a considerable amount of centrifugal force is generated. Obviously, this force would tend to separate the two halves of the blade thereby posing a very serious safety problem. One type of prior art collar comprises a split collar, which engages the blade halves by means of dowels or pins, and which is bolted together by means of bolts extending transversely to the axis of the blade. Because of the trememdous centrifugal forces generated by the rotating mass of the blade halves, however, these bolts are stressed to the point that they begin to stretch. When this occurs, the bolts could break thereby permitting the blade halves to fly off the arbor. Even if the bolts would not break, the outward movement of the collars may cause unusual stresses to be developed in the pins or dowels connecting them to the blade halves so that failure of the dowels or pins may occur.

SUMMARY OF THE INVENTION

In order to overcome the problems and disadvantages of the prior art locking collars, the present invention provides an interlocking rib and groove arrangement between the integral, circular collar and the blade halves. This distributes the radial forces generated by the rotating blade evenly over a relatively large surface so that the radial forces are not localized, as in the case of the retaining bolts for the prior art locking collars. This arrangement allows for easy insertion and removal of a tool from its collar yet, when the assembly is locked-up, unduly large radial forces are not concentrated at any point on the assembly.

Specifically, the present invention contemplates a tool assembly comprising: a first collar having a generally cylindrical body portion and a flange portion wherein the flange portion includes a tool engaging surface, a circular split tool, such as a sawblade, dado blade, cutting head, etc., comprising a plurality of segments which, when assembled, has a central opening through which the body portion of the first collar extends, and a second collar disposed around the first collar body portion and having a tool engaging surface on the opposite side of the tool in engagement therewith. At least one annular rib on either the tool or one of the collars interlocks with a corresponding annular groove on the mating surface of the other of the tool or collar. A locking collar is threadedly secured to the body portion of the first collar and urges this second collar against the tool so as to tightly clamp the tool between the first and second collars. Pins key together the respective segments of the tool to the first collar flange portion.

BRIEF DESCRIPTION OF THE DRAWINGS

FIG. 1 is a perspective view of the partially assembled locking collar assembly according to the present invention and one half of a circular sawblade;

FIG. 2 is a fragmentary sectional view of the completely assembled locking collar assembly and sawblade; and FIG. 3 is a fragmentary exploded view of a portion of the locking collar assembly and the sawblade halves.

DETAILED DESCRIPTION

With reference now to the drawings, it will be seen that the locking collar assembly comprises a first collar 4 having a generally cylindrically-shaped body portion 6, and a flange 8 extending outwardly from body portion 6. The end of body portion 6 farthest from flange 8 is provided with threads 10, which terminate in an annular seating surface 12 contiguous with flange 8. Flange 8 includes a tool-engaging face 14 which is provided with an annular rib 16 extending circularly completely around. Openings 18 are adapted to be engaged by a standard wrench for holding collar 4 stationary when the locking assembly is tightened.

A second collar 20, which is annular in shape and includes an inner surface 22, is slidably supported on the unthreaded portion 12 of collar 4. Its tool engaging face 24 includes a circular rib 26 positioned oppositely rib 16 and extending completely around the tool engaging face 24 of collar 20.

The sawblade 28 is comprised of two halves 30 and 32, each of which includes a semi-circular groove 34 on each side 36 and 38. When blade halves 30 and 32 are placed together with their respective mating edges 40 in abutment or near abutment, grooves 34 form a pair of circular grooves on opposite sides of blade 28. Grooves 34 have the same basic dimensions as ribs 16 and 26 so that when the outer collar 20 is positioned, ribs 16 and 26 will interlock with grooves 34 so as to bolt the two blade halves in place on the collar assembly. An alternate construction (not shown) would be to provide a pair of oppositely facing ribs on blade halves 30 and 32 with corresponding grooves in collars 4 and 20.

Outer collar 20 is urged against blade 28 by means of outer locking collar 42, which is annular in shape and provided with internal threads adapted to threadedly engage the threads 10 of inner collar 4. Locking collar 42 is provided with openings 44 adapted to be engaged by a conventional spanner wrench for tightening locking collar 42 against collar 20. When locking collar 42 is fully tightened, blade halves 30 and 32 will be clamped between collar 20 and the flange 8 of inner collar 4.

Four steel dowels 46, two per each blade half 30 and 32, are press fit in openings 48 in flange 8 and extend into corresponding openings in blade halves 30 and 32. Dowels 46 provide an additional margin of safety in the unlikely event that the groove and rib locking should fail. By providing at least two dowels 46 for each half 30, 32 of blade 28, pivoting of the blade halves 30 and 32 in the event the groove and rib interlocking should fail would be prevented. Dowels 46 preferably extend sufficiently into blade 28 to prevent its being released without substantial loosening of the threaded collar 42.

A centering sleeve 52, which is provided with a plurality of axial slots 54, is received within inner collar 4. A 30° annular shoulder 56 on sleeve 52 engages a corresponding shoulder 58 on inner collar 4. The end of sleeve 52 furthest from shoulder 56 is provided with threads 60 so that locknut 62 may be threaded thereon. A locking sleeve 63 includes a 30° shoulder 64, which engages a similar shoulder 66 on collar 4. When locknut 62 is tightened on sleeve 52 by this arrangement, the entire assembly is centered on the arbor (not shown).

To remove blade 28, locking collar 42 is engaged by a spanner wrench and backed off sufficiently to permit intermediate collar 20 to be withdrawn so that the clearance between ribs 16 and 26 and between intermediate collar 20 and dowels 46 is sufficient to permit the blade halves 30 and 32 to be withdrawn in a radial direction. The new blade is then installed such that the semi-circular grooves 34 interlock with ribs 16 and its openings 70 can receive dowels 46. Intermediate collar 20 is then urged against blade 28 by tightening locking collar 42, and the blade assembly is now ready for use.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A tool assembly comprising:
a first collar having a generally cylindrical body portion and a flange portion, said flange portion including a tool engaging surface,
a circular, split tool comprising a plurality of segments, said tool, when assembled, having a central opening through which the body portion of said first collar extends,
a second collar being disposed around said first collar body portion and having a tool engaging surface, the respective tool engaging surfaces of said collars being on opposite sides of and in engagement with said tool,
an annular groove on one side of said tool and an annular rib on the tool engaging surface of the collar in engagement with said tool one side, said annular rib and groove interlocking with each other,
a second annular groove on the other side of said tool and a second annular groove on the tool engaging surface of the collar and in engagement with said tool other side, said second rib and groove interlocking with each other,
a locking collar threadedly secured to the body portion of said first collar and urging said second collar against said tool so as to tightly clamp said tool between said first and second collars, and
pins keying together the respective segments of said tool to said first collar flange portion.

2. The tool assembly of claim 1 wherein the annular grooves are on said tool and are directly opposite each other on the respective sides of said tool, and said annular ribs are on said first and second collars, respectively.

3. The tool assembly of claim 1 wherein said pins comprise dowels press fit into said flange portion and extending into openings in said tool.

4. The tool assembly of claim 1 wherein said tool is a sawblade.

5. A tool assembly comprising:
a first collar having a generally cylindrical body portion and a flange portion, said flange portion including a tool engaging surface,
a circular, split tool comprising a plurality of segments, said tool, when assembled, having a central opening through which the body portion of said first collar extends,
a second collar being disposed around said first collar body portion and having a tool engaging surface, the respective tool engaging surfaces of said collars being on opposite sides of and in engagement with said tool,
an annular groove on one side of said tool and an annular rib on the tool engaging surface of the collar in engagement with said tool one side, said annular rib and groove interlocking with each other,
said second collar being slidably received over said first collar body portion for axial movement,
a locking collar threadedly secured to the body portion of said first collar and urging said second collar against said tool so as to tightly clamp said tool between said first and second collars, and
pins keying together the respective segments of said tool to said first collar flange portion.

6. The tool assembly of claim 5 including a sleeve extending through said first, second and locking collars, said sleeve having a shoulder axially engaging said first collar, and a lock nut threadedly secured to said sleeve and having a shoulder axially engaging said locking collar, said sleeve and lock nut axially clamping said first, second and locking collars together.

7. The tool assembly of claim 6 wherein said sleeve has at least one slot therein extending from one point to another point spaced axially from the first point.

8. The tool assembly of claim 6 wherein said sleeve and lock nut shoulders are tapered and engage respective tapered shoulders on said first collar.

9. The tool assembly of claim 5 wherein said tool is a sawblade.

* * * * *